United States Patent
Zhou et al.

(10) Patent No.: US 9,912,190 B2
(45) Date of Patent: Mar. 6, 2018

(54) ENERGY SUPPLY METHOD AND DEVICE FOR MONITORING WIRELESS SENSOR NODE OF ROLLER

(71) Applicant: CHINA UNIVERSITY OF MINING AND TECHNOLOGY, Xuzhou, Jiangsu (CN)

(72) Inventors: Gongbo Zhou, Xuzhou (CN); Zhencai Zhu, Xuzhou (CN); Peng Zhang, Xuzhou (CN); Wei Li, Xuzhou (CN); Guohua Cao, Xuzhou (CN); Penghui Wang, Xuzhou (CN)

(73) Assignee: China University of Mining and Technology, Jiangsu (CN)

( * ) Notice: Subject to any disclaimer, the term of this patent is extended or adjusted under 35 U.S.C. 154(b) by 32 days.

(21) Appl. No.: 15/126,836

(22) PCT Filed: May 13, 2015

(86) PCT No.: PCT/CN2015/078844
§ 371 (c)(1),
(2) Date: Sep. 16, 2016

(87) PCT Pub. No.: WO2016/058373
PCT Pub. Date: Apr. 21, 2016

(65) Prior Publication Data
US 2017/0098955 A1    Apr. 6, 2017

(30) Foreign Application Priority Data
Oct. 15, 2014   (CN) .......................... 2014 1 0547104

(51) Int. Cl.
*H02J 7/00*    (2006.01)
*H04W 84/18*    (2009.01)
(Continued)

(52) U.S. Cl.
CPC .............. *H02J 7/045* (2013.01); *H02J 7/025* (2013.01); *H02J 50/10* (2016.02); *H02J 50/80* (2016.02); *H04W 84/18* (2013.01)

(58) Field of Classification Search
CPC .. H02J 7/045; H02J 7/025; H02J 50/80; H02J 50/10
(Continued)

(56) References Cited

U.S. PATENT DOCUMENTS

| | | | | | |
|---|---|---|---|---|---|
| 4,120,274 | A | * | 10/1978 | De Lancey | ............ F02M 69/00 123/452 |
| 5,947,051 | A | * | 9/1999 | Geiger | .................. B62D 57/00 114/222 |

(Continued)

FOREIGN PATENT DOCUMENTS

| CN | 101413834 A | 4/2009 |
|---|---|---|
| CN | 101668348 A | 3/2010 |

(Continued)

OTHER PUBLICATIONS

PCT International Search Report dated Aug. 3, 2015, for corresponding International Patent application PCT/CN2015/078844, (4 pages).

*Primary Examiner* — Phallaka Kik
(74) *Attorney, Agent, or Firm* — Lewis Roca Rothgerber Christie LLP

(57) ABSTRACT

An energy supply method and device for a monitoring wireless sensor node of a roller. A node energy supply device (2) is arranged on a roller web (1). The node energy supply device (2) comprises a generator (2-1), a disc rail (2-3), an input shaft (2-4), a swing link (2-5), a swing wheel (2-8) and an energy collection module (2-10). The generator (2-1) is driven to rotate using the rotation motion of the roller, the mechanical energy is converted into electric energy by the generator (2-1), and power is supplied to a monitoring (Continued)

wireless sensor node by the energy collection module (2-10). After rectification, filtering and voltage stabilization are conducted on the electric energy generated by cutting a magnetic induction line when the generator (2-1) operates, the energy collection module (2-10) uses the electric energy for charging an internal battery of the monitoring wireless sensor node. When the roller operates, the swing wheel (2-8) will keep vertically downward because of the gravity action thereof, thereby rotating relative to the input shaft (2-4) of the generator (2-1) to drive the generator (2-1) to operate. The present invention has the advantages of simple structure without manual operations, and energy saving and environmental protection.

5 Claims, 2 Drawing Sheets

(51) Int. Cl.
    *H02J 7/04*     (2006.01)
    *H02J 50/10*     (2016.01)
    *H02J 50/80*     (2016.01)
    *H02J 7/02*     (2016.01)

(58) Field of Classification Search
    USPC .............................. 320/108, 112, 123, 134
    See application file for complete search history.

(56) References Cited

U.S. PATENT DOCUMENTS

| | | | | |
|---|---|---|---|---|
| 6,402,031 | B1* | 6/2002 | Hall | G05B 19/00 235/400 |
| 7,246,567 | B2* | 7/2007 | Shelton | B63G 8/001 114/312 |
| 8,469,861 | B1* | 6/2013 | McFee | A63B 21/0059 482/4 |
| 8,769,315 | B1 | 7/2014 | Ortiz et al. | |
| 2001/0056544 | A1* | 12/2001 | Walker | B60R 25/02 726/2 |
| 2002/0153419 | A1* | 10/2002 | Hall | G05B 19/00 235/400 |
| 2005/0022585 | A1* | 2/2005 | Berkman | E02D 1/02 73/78 |
| 2005/0053388 | A1* | 3/2005 | Yokoyama | G03G 15/1625 399/66 |
| 2007/0100255 | A1* | 5/2007 | Boecker | A61B 5/14532 600/583 |
| 2008/0115608 | A1* | 5/2008 | Birdi | F16D 7/044 74/405 |
| 2008/0163621 | A1* | 7/2008 | Johnson | B01J 15/005 60/517 |
| 2009/0045195 | A1* | 2/2009 | Djerf | B65D 65/40 220/62.11 |
| 2010/0052324 | A1* | 3/2010 | Priya | C04B 35/493 290/50 |
| 2011/0067353 | A1* | 3/2011 | Tadayon | E04H 12/344 52/745.18 |
| 2012/0184955 | A1* | 7/2012 | Pivotto | A61B 19/2203 606/41 |
| 2013/0340572 | A1* | 12/2013 | Flusche | E21B 15/00 81/57.4 |
| 2015/0280099 | A1* | 10/2015 | Boukai | H01L 35/32 136/203 |
| 2016/0245386 | A1* | 8/2016 | Rossberger | F16H 49/001 |
| 2016/0313636 | A1* | 10/2016 | Chien | G03B 29/00 |
| 2017/0079481 | A1* | 3/2017 | Tsibulevskiy | A47K 3/281 |
| 2017/0079482 | A1* | 3/2017 | Tsibulevskiy | A47K 3/281 |
| 2017/0198401 | A1* | 7/2017 | Phillips | C25B 9/04 |

FOREIGN PATENT DOCUMENTS

| | | |
|---|---|---|
| CN | 103217235 A | 7/2013 |
| CN | 103230944 A | 8/2013 |
| CN | 104467142 A | 3/2015 |

* cited by examiner

ENERGY SUPPLY METHOD AND DEVICE FOR MONITORING WIRELESS SENSOR NODE OF ROLLER

CROSS-REFERENCED TO RELATED APPLICATION(S)

This Application is a National Phase Patent Application and claims priority to and the benefit of International Application Number PCT/CN2015/078844, filed on May 13, 2015, which claims priority to and the benefit of Chinese Application 201410547104.4, filed Oct. 15, 2014, the entire contents of all of which are incorporated herein by reference.

TECHNICAL FIELD

The present invention relates to a power supplying method and device for monitoring wireless sensor node, in particular, to a power supplying method and device for roller monitoring wireless sensor node.

BACKGROUND OF THE INVENTION

With continuous development of wireless sensor network technology, the wireless sensor network is widely used in state monitoring of mechanized equipment due to the advantages of small in size, easy and convenient to be arranged, free from wiring, convenient for maintaining and the like. For example, patent application CN101413834 proposes to apply the monitoring wireless sensor node to stress field detection of the roller of an elevator, however, in actual application, since the wireless sensor node disposed on the elevating roller web would move along with the detected object, the wireless sensor node can only be powered by a dry battery or an accumulator. Moreover, the sensor node consumes a larger amount of energy with respect to the battery, which causes frequent changing of batteries, which greatly restricts the development of the online monitoring system of the wireless sensor network, and reduces reliability of the system. Since changing the batteries requires to be done after turning off the machine, smooth manufacturing procedure is influenced. In order to solve the problem of supplying energy to the sensor node, it is proposed to use a backup power supply. When the electric quantity of the battery on the node runs out, it automatically switches to other power sources for supplying power. However, too many batteries would increase the volume of the node, and is not convenient for installation. It is also proposed to use the energy generated by air flow during the rotation procedure of the roller web to supply power to the node, however, the energy collected in this way is a little, so a relatively long period of time is required to satisfy the electricity utilization requirements of the node. Moreover, during a high-speed rotation occasion, the collecting device would be hard to install due to large centripetal force and air resistance.

CONTENTS OF THE INVENTION

Technical Problem the purpose of the present invention is to provide a power supplying method and device for a roller monitoring wireless sensor node in real-time and long-term, which is simple to implement with respect to the existing problems in the prior art.

Technical Solutions in order to achieve the abovementioned purpose, the power supplying device for a roller monitoring wireless sensor node of the present invention includes a node power supplying device disposed on a roller web, the node power supplying device includes an electric generator, a round disc rail, an input shaft, a swinging rod, a swinging wheel, and an energy collection module; the electric generator is used to convert mechanical energy to electric energy, and supply electricity to the monitoring wireless sensor node through the energy connection module; the round disc rail is used to ensure the swinging wheel to move in a preset rail, and ensure to prevent a security risk for the swinging wheel to fly out when an failure occurs; the electric generator and the round disc rail are fixed on both sides of the roller web through bolts, the electric generator is located at an inner side of the roller web, and the round disc rail is located at an outer side of the roller web; the energy collection module is disposed on an outer surface of a tail of the electric generator, and is mainly used to apply electric energy to charging an internal battery of the monitoring wireless sensor node after rectifying, filtering and voltage stabilization are conducted on the electric energy generated by cutting magnetic induction line when the electric generator works; the input shaft of the electric generator is provided with the swinging rod; and an end of the swinging rod is provided with the swinging wheel.

Central location of the node power supplying device is apart from three quarters of central location of the roller web, and radius size of the node power supplying device is less than a quarter of radius size of the roller web.

The swinging rod is located inside the round disc rail, is radially positioned with respect to the input shaft of the electric generator through a flat key or spline, and is axially positioned with respect to the input shaft of the electric generator through a fasten nut; and double fasten nuts are adopted to enable the axial positioning of the swinging rod to be more reliable.

The swinging wheel is fixed at a terminal end of the swinging rod through a set screw. A power supplying method using the abovementioned power supplying device for roller monitoring wireless sensor node includes disposing a node power supplying device on the roller web, when the roller web rotates, the node power supplying device rotates with the roller web, and the swinging wheel in the node power supplying device keeps vertically downwards due to self gravity action of the swinging wheel, so that relative rotation with respect to the input shaft of the electric generator in the node powering device is generated, thereby driving the electric generator to work;

when the roller web rotates an angle $\theta_1$, due to a centripetal force and gravity applied to the swinging wheel, the swinging wheel would rotate around an output shaft of the electric generator by an angle $\alpha_1$; along with the rotation of the roller web, the swinging wheel drives the input shaft of the electric generator to continuously rotate, thereby generating electric energy; the energy collection module disposed on the node power supplying device transmits the electric energy generated when the electric generator works to an accumulator inside the node power supplying device after rectifying, filtering and voltage stabilization are conducted on the electric energy, so as to provide desired electric energy for normal work of the monitoring wireless sensor node;

when the roller web performs a uniform circular motion, a normal rotating speed range of the roller can ensure the swinging wheel to be capable of continuously driving the input shaft of the electric generator to rotate; and when the rotation of the roller web is a speed-variable circular motion, since the centripetal force applied to the swinging wheel during the rotating process continuously changes, along with the gravity action, the swinging wheel is also capable of driving the electric generator to generate electricity.

Beneficial Effects due to adopting the aforementioned technical solution, in the present invention, the rotation motion of the roller is used to drive the electric generator to rotate, thereby generating the electric energy, to provide electric energy for the monitoring wireless sensor node disposed on the roller web, which saves energy and is environmental friendly. The electric generator is disposed at an inner side of the roller web; the input shaft of the electric generator is connected to the swinging wheel through the swinging rod; when the roller works normally, the swinging wheel keeps vertically downwards due to self gravity action, so that relative rotation with respect to the input shaft of the electric generator is generated, thereby driving the electric generator to work; the gravitational potential energy of the swinging wheel is an input power source of the electric generator; the round disc rail is used to ensure the swinging wheel to always rotate in the preset rail during the rotation procedure, and ensure to prevent the swinging wheel from being thrown out when electricity generating device fails, to exclude the security risk. When the roller web performs a uniform circular motion, a normal rotating speed range of the roller can ensure the swinging wheel to be capable of continuously driving the input shaft of the electric generator to rotate; and when the rotation of the roller web is a speed-variable circular motion, since the centripetal force applied to the swinging wheel during the rotating process continuously changes, along with the gravity action, the swinging wheel is also capable of driving the electric generator to generate electricity. The device of the present invention is easy to install without involving manual operations; and since the electric generator rotates along with the roller during the working procedure, wiring is not required to be considered. In addition, since the electric generator generates electricity through cutting the magnetic induction line, as long as a relative movement of the swinging wheel with respect to the input shaft of the electric generator exists during the working procedure of the roller, the electric energy can be generated, which has a good application prospect.

Figure 1:
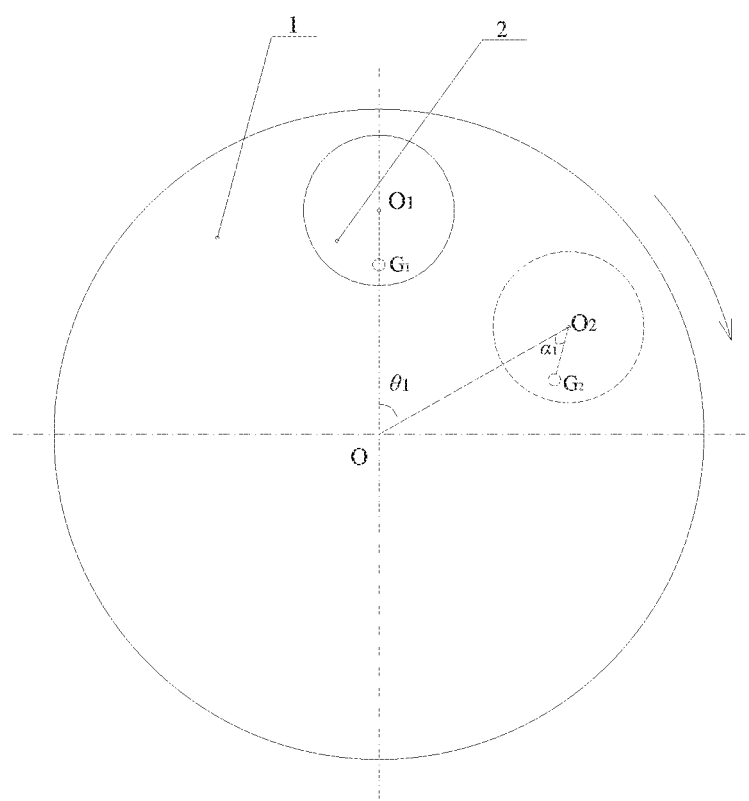
FIG. 1 is a schematic diagram of principle of a power supplying method and device for roller monitoring wireless sensor node of the present invention.

In the drawings: 1—roller web, 2—node power supplying device, 2-1—electric generator, 2-2—bolts, 2-3—round disc rail, 2-4—input shaft, 2-5—swinging rod, 2-6—nut, 2-7—flat key or spline, 2-8—swinging wheel, 2-9—set screw, and 2-10—energy collection module.

DETAILED DESCRIPTION OF THE EMBODIMENTS

Figure 2:
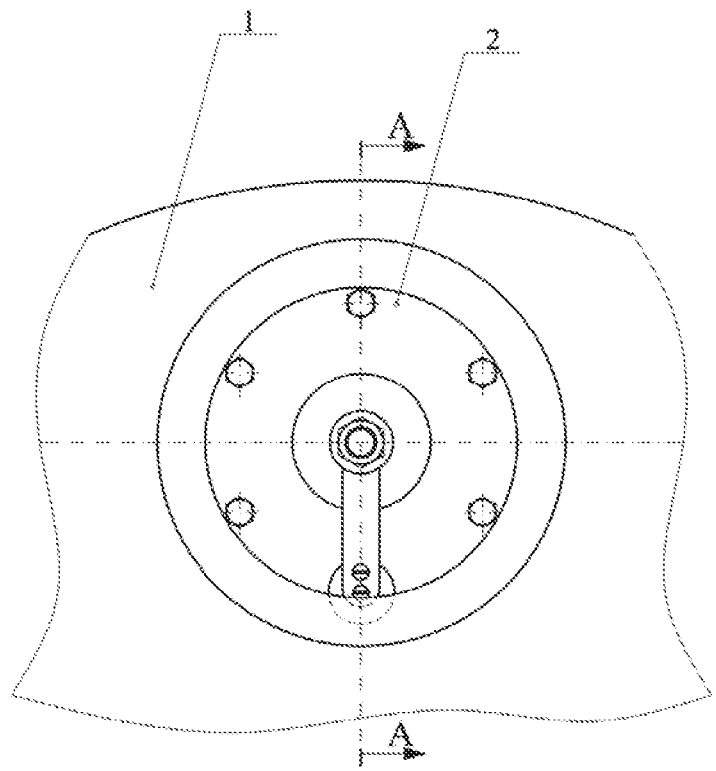
FIG. 2 is a side view of a power supplying device for roller monitoring wireless sensor node of the present invention.
Figure 3:
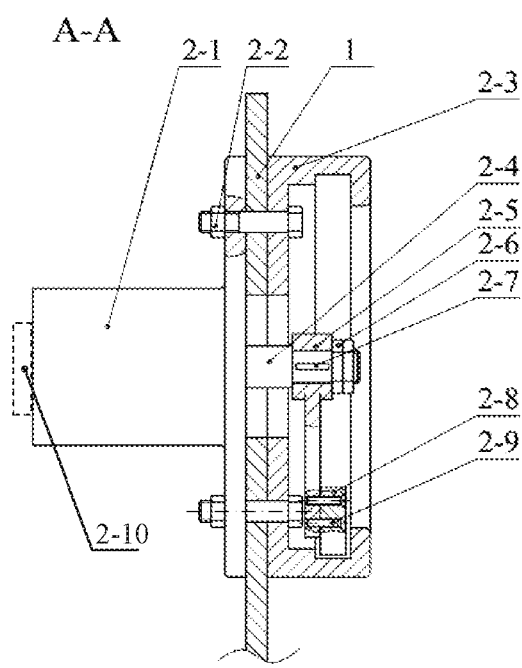
FIG. 3 is a structural diagram of a power supplying device for roller monitoring wireless sensor node of the present invention.

An embodiment of the present invention is further described in combination of the accompany drawings:

As shown in FIG. 1 to FIG. 3, the power supplying device for roller monitoring wireless sensor node includes a node power supplying device 2 disposed on a circumference of a roller web 1, the location of a center $0_1$ of the node power supplying device 2 is apart from three quarters of location of a center 0 of the roller web 1, and radius size of the node power supplying device 2 is less than a quarter of radius size of the roller web 1. The node power supplying device 2 includes an electric generator 2-1, a round disc rail 2-3, an input shaft 2-4, a swinging rod 2-5, a swinging wheel 2-8, and an energy collection module 2-10. The electric generator 2-1 and the round disc rail 2-3 are installed on sides of the roller web 1 through bolts 2-2, the electric generator 2-1 is located at an inner side of the roller web 1, and the round disc rail 2-3 is located at an outer side of the roller web 1. The energy collection module 2-10 is disposed at the tail of the electric generator 2-1, the input shaft 2-4 of the electric generator 2-1 is provided with the swinging rod 2-5, and an end of the swinging rod 2-5 is provided with the swinging wheel 2-8.

The electric generator 2-1 is used to convert mechanical energy to electric energy, and supply electricity to the monitoring wireless sensor node through the energy connection module 2-10.

The round disc rail 2-3 is used to ensure the swinging wheel 2-8 to move in a preset rail, and ensure to prevent a security risk of the swinging wheel 2-8 to fly out when an failure occurs.

The swinging rod 2-5 is located inside the round disc rail, is radially positioned with respect to the input shaft 2-4 of the electric generator through a normal A-type flat key 2-7, and is axially positioned with respect to the input shaft 2-4 of the electric generator through a fasten nut 2-6. Double fasten nuts 2-6 may be adopted to enable the axial positioning of the swinging rod 2-5 to be more reliable.

The swinging wheel 2-8 is connected to a terminal end of the swinging rod 2-5 through a set screw 2-9. The mounting approach is easy and has high reliability.

The energy collection module 2-10 is disposed on an outer surface of a tail of the electric generator 2-1, and is mainly used to apply electric energy generated when the electric generator 2-1 cuts a magnetic induction line in the working process to charge an internal battery of the monitoring wireless sensor node after rectifying, filtering and voltage stabilization are conducted on the electric energy.

The power supplying method for roller monitoring wireless sensor node of the present invention includes the following steps: a node power supplying device 2 is disposed on the circumference of the roller web 1, and when the roller web 1 rotates, the node power supplying device 2 rotates along with the roller web 1, and a swinging wheel 2-8 in the node power supplying device 2 keeps vertically downwards due to a self gravity $G_1$ action of the swinging wheel 2-8, so that relative rotation with respect to the input shaft 2-4 of the electric generator in the node power supplying device 2 is generated, thereby driving the electric generator 2-1 to work; when the roller web 1 rotates an angle $\theta_1$, the center of the node power supplying device 2 is located at $0_2$, and due to an action of a resultant force $G_2$ of a centripetal force and gravity applied to the swinging wheel 2-8, the swinging wheel 2-8 would rotate around an output shaft 2-4 of the electric generator by an angle $\alpha_1$; along with the rotation of the roller web 1, the swinging wheel 2-8 drives the input shaft 2-4 of the electric generator to continuously rotate, thereby generating electric energy; the energy collection module 2-10 disposed on the node power supplying device 2 transmits the electric energy generated when the electric generator 2-1 works to an accumulator inside the node power supplying device 2 after rectifying, filtering and voltage stabilization are conducted on the electric energy, so as to provide desired electric energy for normal work of the monitoring wireless sensor node.

When the roller web 1 performs a uniform circular motion, a normal rotating speed range of a roller of an elevator can ensure the swinging wheel 2-8 to be capable of continuously driving the input shaft 2-4 of the electric generator to rotate.

When the rotation of the roller web 1 is a speed-variable circular motion, since the centripetal force applied to the swinging wheel 2-8 during the rotating process continuously changes, along with the gravity action, the swinging wheel 2-8 is also capable of driving the electric generator 2-1 to generate electricity.

What is claimed is:

1. A power supplying device for roller monitoring wireless sensor node, comprising a node power supplying device (2) disposed on a roller web (1), the node power supplying device (2) includes an electric generator (2-1), a round disc rail (2-3), an input shaft (2-4), a swinging rod (2-5), a swinging wheel (2-8), and an energy collection module (2-10); the electric generator (2-1) is used to convert mechanical energy to electric energy, and supply electricity to the monitoring wireless sensor node through the energy connection module (2-10); the round disc rail (2-3) is used to ensure the swinging wheel (2-8) to move in a preset rail, and ensure to prevent a security risk of the swinging wheel (2-8) to fly out when a failure occurs; the electric generator (2-1) and the round disc rail (2-3) are fixed on sides of the roller web (1) through bolts (2-2), the electric generator (2-1) is located at an inner side of the roller web (1), and the round disc rail (2-3) is located at an outer side of the roller web (1); the energy collection module (2-10) is disposed on an outer surface of a tail of the electric generator (2-1), and is mainly used to apply electric energy generated when the electric generator (2-1) cuts a magnetic induction line in the working process to charge an internal battery of the monitoring wireless sensor node after rectifying, filtering and voltage stabilization are conducted on the electric energy; the input shaft (2-4) of the electric generator (2-1) is provided with the swinging rod (2-5); and an end of the swinging rod (2-5) is provided with the swinging wheel (2-8).

2. The power supplying device for roller monitoring wireless sensor node according to claim 1, wherein central location of the node power supplying device (2) is apart from three quarters of central location of the roller web (1), and radius size of the node power supplying device (2) is less than a quarter of radius size of the roller web (1).

3. The power supplying device for roller monitoring wireless sensor node according to claim 1, wherein the swinging rod (2-5) is located inside the round disc rail (2-3), is radially positioned with respect to the input shaft (2-4) of the electric generator through a flat key or spline (2-7), and is axially positioned with respect to the input shaft (2-4) of the electric generator through a fasten nut (2-6); and double fasten nuts (2-6) are adopted to enable the axial positioning of the swinging rod (2-5) to be more reliable.

4. The power supplying device for roller monitoring wireless sensor node according to claim 1, wherein the swinging wheel (2-8) is fixed at a terminal end of the swinging rod (2-5) through a set screw (2-9).

5. A power supplying method using the power supplying device for roller monitoring wireless sensor node according to claim 1, comprising disposing a node power supplying device (2) on a roller web (1), wherein when the roller web (1) rotates, the node power supplying device (2) rotates along with the roller web (1), and a swinging wheel (2-8) in the node power supplying device (2) keeps vertically downwards due to a self gravity action of the swinging wheel (2-8), so that relative rotation with respect to an input shaft (2-4) of a electric generator in the node power supplying device (2) is generated, thereby driving the electric generator (2-1) to work;

when the roller web (1) rotates an angle $\theta_1$, due to a centripetal force and gravity applied to the swinging wheel (2-8), the swinging wheel (2-8) would rotate around an output shaft (2-4) of the electric generator by an angle $\alpha_1$; along with the rotation of the roller web (1), the swinging wheel (2-8) drives the input shaft (2-4) of the electric generator to continuously rotate, thereby generating electric energy; an energy collection module (2-10) disposed on the node power supplying device (2) transmits the electric energy generated when the electric generator (2-1) works to an accumulator inside the node power supplying device (2) after rectifying, filtering and voltage stabilization are conducted on the electric energy, so as to provide desired electric energy for normal work of the monitoring wireless sensor node;

when the roller web (1) performs a uniform circular motion, a normal rotating speed range of the roller can ensure the swinging wheel (2-8) to be capable of continuously driving the input shaft (2-4) of the electric generator to rotate; and when the rotation of the roller web (1) is a speed-variable circular motion, since the centripetal force applied to the swinging wheel (2-8) during the rotating process continuously changes, along with the gravity action, the swinging wheel (2-8) is also capable of driving the electric generator (2-1) to generate electricity.

* * * * *